United States Patent [19]

Young et al.

[11] Patent Number: 4,502,906
[45] Date of Patent: Mar. 5, 1985

[54] HEAT WELDING OF THERMOPLASTICS

[75] Inventors: William E. Young, 60 W. Concourse, Neptune, N.J. 07753; Ernst W. Gerber, Sabattos Rd., Center Lovell, Me. 04016; William R. Pasco, Bricktown, N.J.

[73] Assignees: William E. Young; Ernst W. Gerber

[21] Appl. No.: 489,932

[22] Filed: Apr. 29, 1983

Related U.S. Application Data

[63] Continuation-in-part of Ser. No. 327,127, Dec. 2, 1981, abandoned.

[51] Int. Cl.$^3$ ............................................. B32B 31/18
[52] U.S. Cl. .................................. 156/251; 156/304.6; 156/498; 156/499; 156/515
[58] Field of Search ...................... 156/251, 304.6, 498, 156/499, 512, 515, 517, 583.5

[56] References Cited

U.S. PATENT DOCUMENTS

| 2,606,850 | 8/1952 | Piazze | 156/499 |
| 3,304,217 | 2/1967 | Mommsen et al. | 156/499 |
| 3,413,175 | 11/1968 | Rochla | 156/499 |
| 4,259,134 | 3/1981 | Joice et al. | 156/251 |
| 4,319,952 | 3/1982 | Schjeldahl | 156/515 |

FOREIGN PATENT DOCUMENTS

| 788969 | 7/1968 | Canada | 156/515 |
| 1398248 | 6/1975 | United Kingdom | 156/515 |

*Primary Examiner*—Caleb Weston
*Attorney, Agent, or Firm*—Ralph R. Roberts

[57] ABSTRACT

The several embodiments illustrated in the FIGS. show welding apparatus for joining a plurality of plies of laminar thermoplastic materials held in and by gripping apparatus such as clamp jaws or belts. The weld is made by locally melting said plies by heating their protruding edges to a determined degree and for a determined period of time. Heat is brought into close proximity to the melt area and the gripping means provides a cooling means for the gripped plies of film. The completed welds are then cooled. The welding apparatus may be applied to material plies to seal their edges, or to seal the plies intermediate their edges. The welding is also shown as produced by continuous means and a heated ribbon may provide the severing means.

15 Claims, 33 Drawing Figures

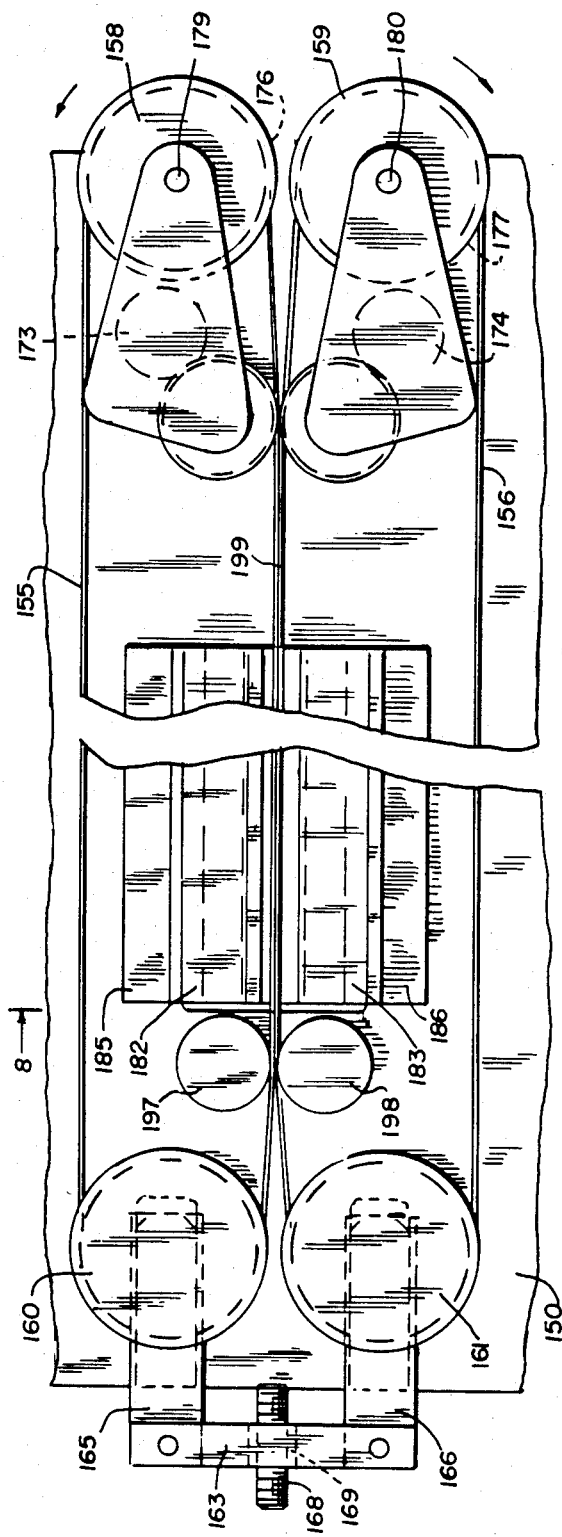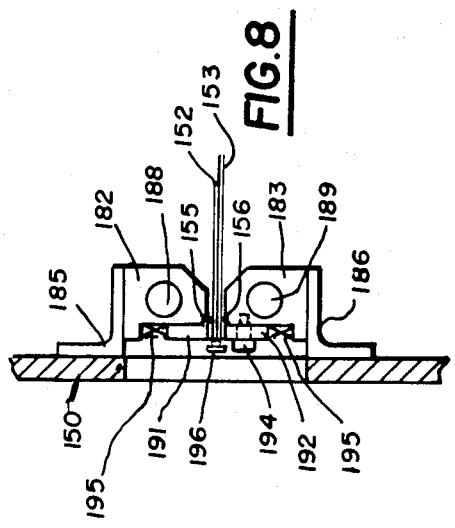

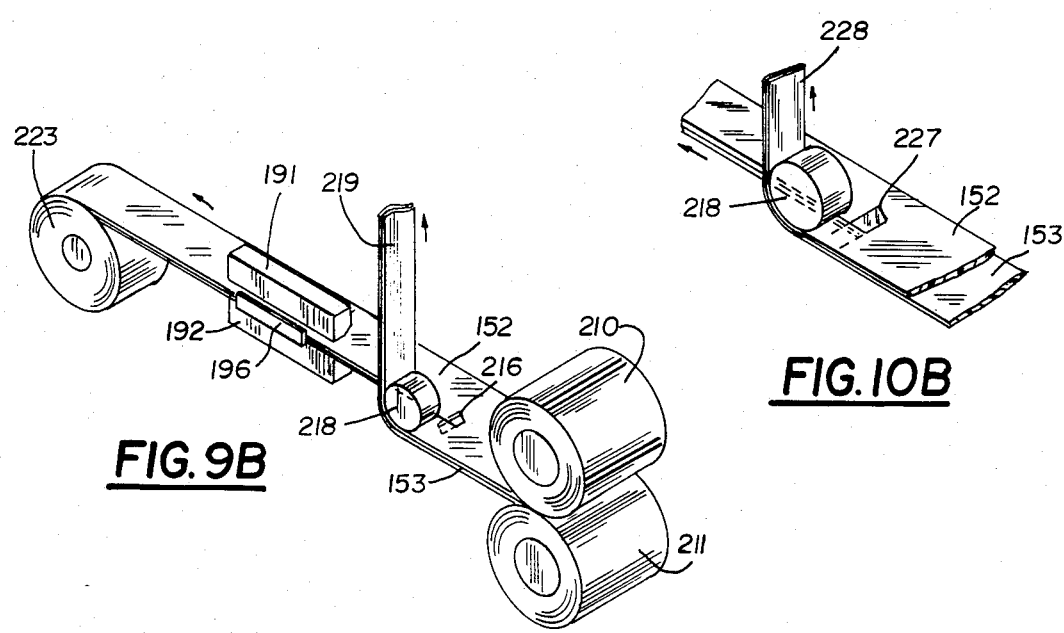
FIG. 9B
FIG. 10B
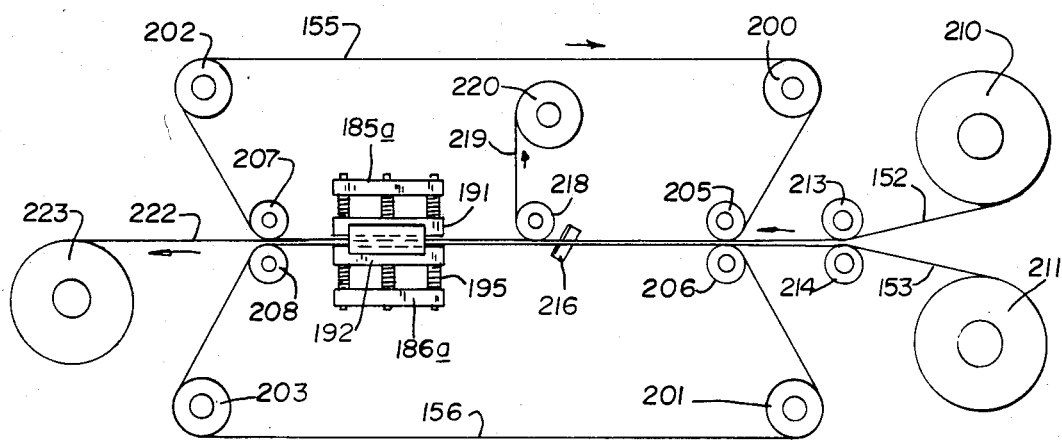
FIG. 9A
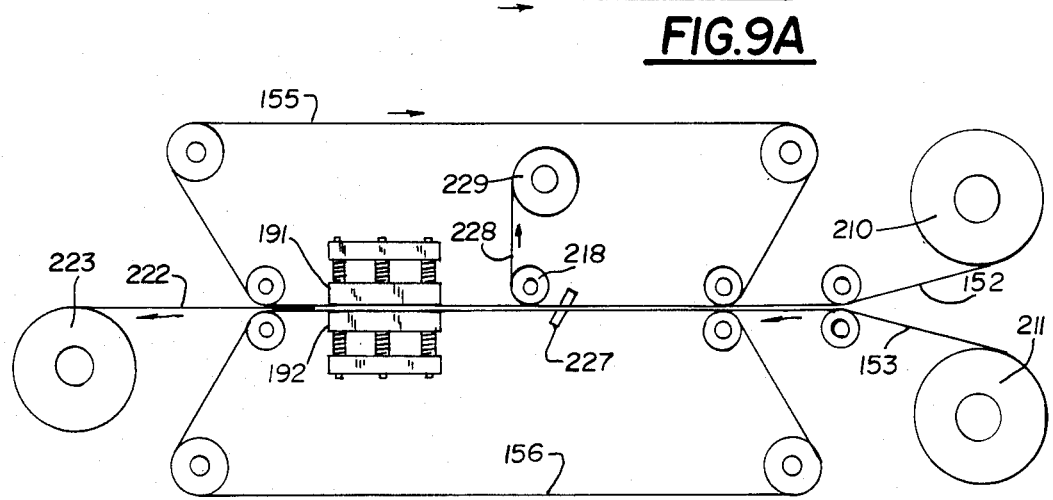
FIG. 10A

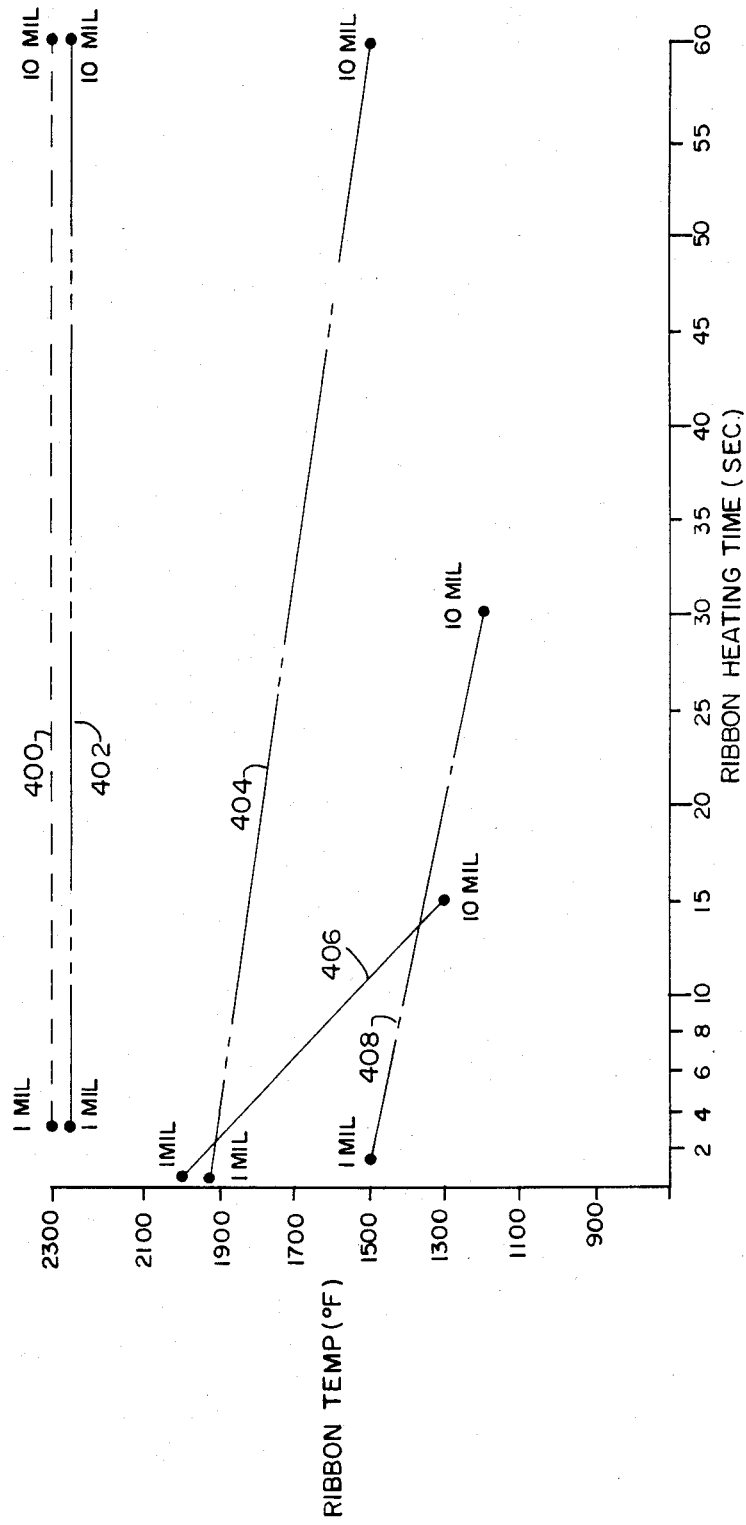

HEAT WELDING OF THERMOPLASTICS

REFERENCE TO RELATED APPLICATION

This is a continuation-in-part application incorporating in part the disclosure in U.S. application Ser. No. 327,127 filed Dec. 2, 1981, now abandoned, entitled, "Heat Welding of Thermoplastics".

BACKGROUND OF THE INVENTION

1. Field of the Invention

This invention pertains to welding of very hard to satisfactorily weld highly oriented thermoplastic materials and cast Nylon. The bead welding of this material requires very critical parameters of time, temperature and extension from cooled clamp jaws.

2. Description of the Prior Art

There are presently many patents and inventions relating to "bead" heat welding of plastic film with congruent edges. Most of these patents pertain to, plastic film containing or coated with copolymers, various plasticizers and other additives which are substantially distinct from polyester film containing no additives. Polyester is the generic name for polyethylene terephthalate. Mylar type D (DuPont TM) having high clarity, balanced biaxially orientated, heat set film is such a film.

The unique properties of this Mylar type D are a tensile strength of at least 25,000 p.s.i.; semi-rigidity; inertness; extremely long shelf life; contains no plasticizers; has a very high melt temperature, and is resistant to most chemicals, acids, alkalines, oils and other organics. It is relatively impermeable to moisture and oxygen and has a heat conduction and is inert from fungus attacks. Has extremely high initial tear strength and has unique dielectric properties. Mylar is used to store valuable documents and collector's items, film negatives and many other items affected by volatile plasticizers and additive compounds of the many other types of plastic films.

It is commonly realized, in the present state of the art, that sealing this type of polyester film with ultrasonic welding can lead to one or more of the following problems: brittle seals, opaque recrystallization of the sealed bead (a milky white appearance); loss of strength of the seal; heat warping of the unsealed surfaces, and decomposition of the plastic on portions of the seal. The melt temperature is very close to the decomposition temperature, thus portions of the bead seal may become overheated and decompose.

Applying the known art such as shown in U.S. Pat. No. 2,679,469 to Bedfore as issued on May 25, 1954; U.S. Pat. No. 3,321,353 to Zelnick as issued May 23, 1967; U.S. Pat. No. 3,330,716 to Zelnick as issued July 11, 1967; U.S. Pat. No. 3,326,735 to Beason, Jr. as issued June 20, 1967; U.S. Pat. No. 3,355,337 to Zelnick as issued Nov. 28, 1967; U.S. Pat. No. 3,736,219 to McTaggart as issued May 29, 1973; and U.S. Pat. No. 4,197,149 to Freitag as issued Apr. 8, 1980 to the seal of Mylar film without using the distance, time and temperature control mentioned or suggested in the following description causes unsatisfactory results as listed above. Any or all of the above results are adverse to the intended use of Mylar film. It is a purpose of this invention to provide a seal to effectively eliminate all of the above adverse results.

SUMMARY OF THE INVENTION

This invention may be summarized, at least in part, with reference to its objects. It is an object of this invention to provide, and it does provide, a bead welding of Mylar film which provides an extremely strong, flexible, clear, unwarping seal.

It is a further object of this invention to provide, and it does provide, a method of welding two or more films of thicknesses from about one-half mil to ten or more mils (0.0005 to 0.010 inches 0.0125 to 0.254 mm.). This method of welding is provided by a hot ribbon and a cooling clamp. Heat from this ribbon is applied to the film for a determined period of time and temperature after which cooling is rapidly applied to the seal to bring the sealed film down to acceptable temperature levels.

In brief, the apparatus to be hereinafter more fully described utilizes ribbon heating to bead weld two or more sheets of plastic to each other. The ribbon is spaced from the edges of the film and said edges are melted after being brought into position. This apparatus includes means for clamping the films and with the congruent edge portions extending an established distance from the clamp, a heated ribbon spaced an established distance from these edges causes said edges to be bead welded. An eccentric apparatus when actuated moves the cold ribbon to and away from the clamped edges of the film providing locating means for the film edges prior to clamping. In another embodiment two or more sheets of film are clamped together and held between spaced apart pairs of clamp jaws, then the edge of a heated ribbon is moved through the films to effect the severing, melting and bead welding of the film plies. The heated ribbon is used to cut and weld the thermoplastic strips or sheets. Distance, time and heat are critical to successful bead welding, particularly when Mylar D or other highly oriented materials are welded.

The very difficult to seal material and one requiring very closer adherence to the to-be-noted parameters are heat set biaxially orientated polyester films, such as Mylar, Melinex, and Hostaphan; heat set biaxially orientated polypropylene films; orientated and cast polyamid films; shrink films made from polyolefins and polyesters; non-woven materials, made from highly orientated fibers, such as polyolefins, polyesters and polyamids; knit and woven materials made from highly orientated fibers such as polyolefins, polyesters, and polyamids; highly orientated high density polyethylene, and cast nylon.

Continuous welding is contemplated and is shown in an embodiment in which the plies are carried by endless bands or belts and the edges of the plies are trimmed to provide the precise extension of the thermoplastic plies of material as they are brought to and through the heating area. A heated ribbon is precisely spaced from the extending edges of the plies so that the bead welding is made within the defined parameters.

It is, of course, realized that the apparatus shown for bead welding of hard-to-weld plastic films such as Mylar may also be used for the welding of other films which are easier to weld together. Each embodiment satisfactorily produces a weld for both very difficult and easy to weld films. The precise spacing or positioning, the time interval and the amount of radiant heat supplied enables welding of films of less than one mil thick and more than ten mils thick.

BRIEF DESCRIPTION OF THE DRAWINGS

FIG. 7 represents a side view, partly fragmentary and diagrammatic and showing continuous edge welding of two plies of film;

FIG. 8 represents a fragmentary sectional side view in an enlarged scale of the apparatus of FIG. 7, this view taken on the line 8—8 thereof and looking in the direction of the arrows;

FIG. 9A repesents a diagrammatic side view of the welding apparatus of FIG. 7 but with an edge trimming knife and with the apring actuated ribbon jaws retained by recess means in the retaining members;

FIG. 9B represents a fragmentary and diagrammatic isometric view showing a knife for precisely trimming the advancing plies to provide a defined extension of the plies beyond the supporting bands and spring-actuated jaw clamps;

FIG. 10A represents a diagrammatic side view of the welding apparatus of FIG. 7 but with edge trimming of the plies of material by a heated ribbon;

FIG. 10B is a very fragmentary isometric view of the plies of material being trimmed by and with this heated ribbon of FIG. 10A;

FIG. 12 is a chart or diagram showing the time and temperature as used for difficult to weld plies of material and employing the apparatus of this invention.

In the following description and in the claims various details are identified by specific names for convenience. These names are intended to be generic in their application. Corresponding reference characters refer to like members throughout the several figures of the drawings.

EMBODIMENT OF FIGS. 1A THROUGH 4H

Figure 1A:
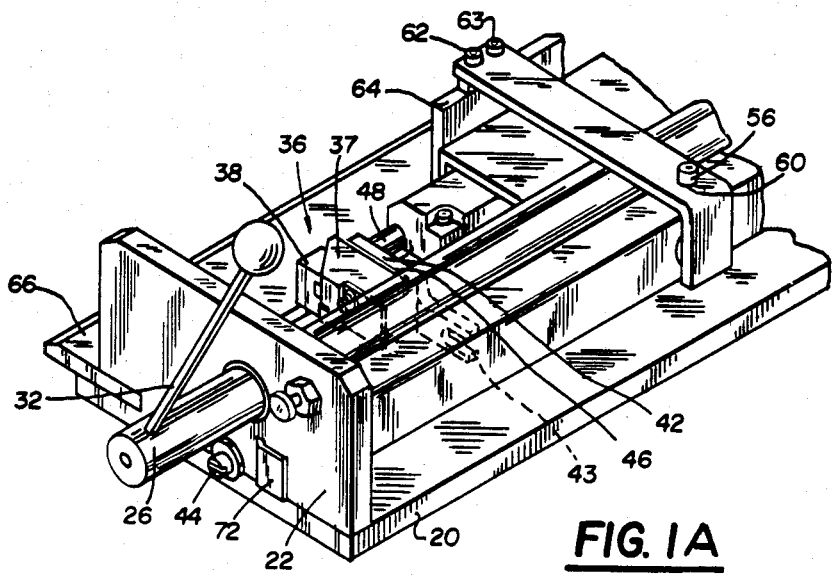
FIG. 1A represents an isometric view, partly diagrammatic and fragmentary and showing apparatus for eccentric movement of an intermittently heated ribbon positioned in way of and away from congruent film edges.
Figure 1B:
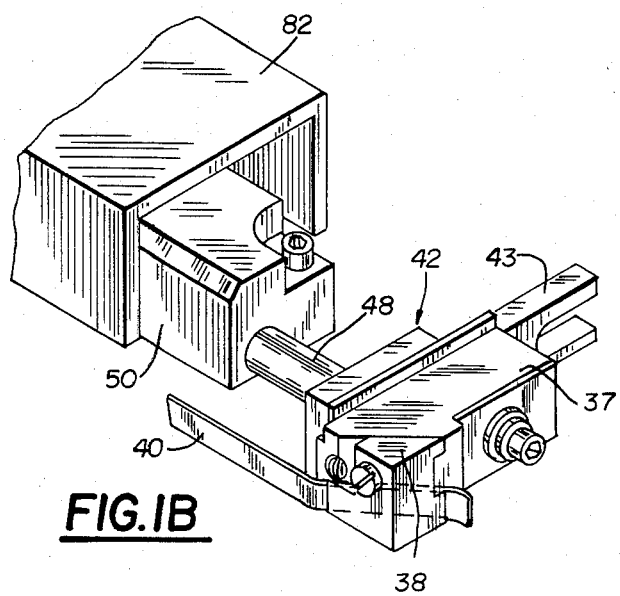
FIG. 1B represents a partly fragmentary isometric view of the apparatus of FIG. 1A and showing in detail the securing of the heating ribbon in relation to the cooling bar.
Figure 1C:
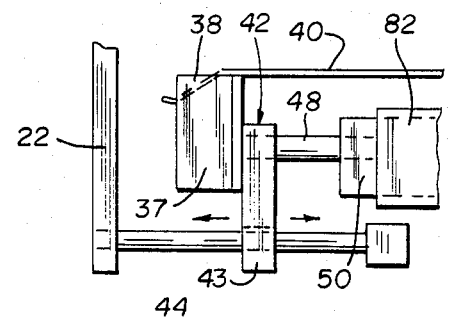
FIG. 1C represents a fragmentary side view partly in section and showing the ribbon securing apparatus.

Referring next to the drawings and the embodiment shown in the apparatus of FIGS. 1A, 1B, 1C, 2 3, and 4A through 4H, it is to be noted that the apparatus is of a length sufficient for bead welding two or more strips of sheets of material. A base plate 20 carries two end plates 22 of which only the near member is seen in FIGS. 1A, 1B and 1C. A protective guard 24 (FIG. 2) is indicated in phantom outline and is secured to the rear edge of the base 20. Carried by these end plates is a rotatable shaft 26. On this shaft is a plurality of like cams 28 which are secured to the shaft by key means 29 and or the like. This key not only aligns the cams as to a flat portion 30 formed on each but also insures that the several cams are not displaced from their mounted condition on the shaft.

The shaft 26 has one end (near) that extends from the end plate 22 at a determined amount and as depicted there is mounted therein a lever handle 32 which is adapted to rotate the shaft a selected amount. This rotation is usually about a quarter turn and stops are provided to establish the limits of rotation. Shown diagrammatically is a ribbon clamp assembly 36 which includes dove-tail blocks 37 and 38. A ribbon 40 that is selectively heated by the passing of electrical current therethrough is carried by a clamp assembly generally identified as 36 at each end of the apparatus. Only the near end clamp assembly 36 is shown in this FIG. 1A. This near end clamp assembly or the far clamp assembly has means to apply a spring tension to the ribbon to maintain it taut as its length increases during heating.

To provide for reciprocal and sliding motion the clamp assembly 36 is provided with a slide guide 42 that has an open forked end 43 engaged by a through rod 44. An electrical insulator 46 of sheet material is disposed between block 37 and guide 42. Also seen is a cooling tube or conduit 48 which is carried in support block 50.

Between the end plates 22 and on a support bar 52 is mounted a plurality of pivot supports 54 which are mounted in threaded holes and extend upwardly from tapped holes formed in support bar 52. Nuts 55 are each mounted on the threaded shank of a socket headed cap screw 56. The screws are rotated so as to be moved up and down and are locked in position by the nut 55. This adjustment is made so as to bring the movable clamp bar means in the desired arrangement.

Figure 2:
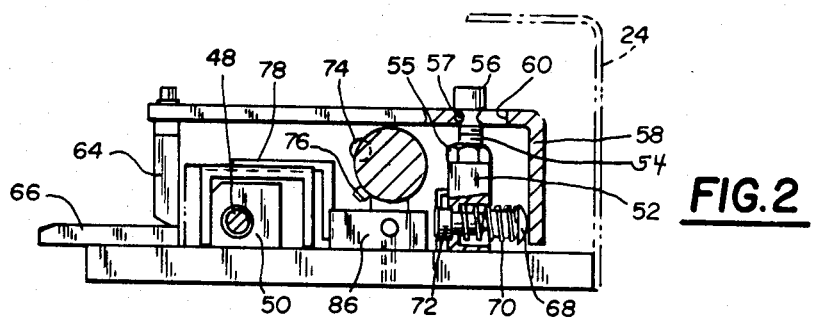
FIG. 2 represents a side view, partly in section and diagrammatic and showing apparatus for gripping the film sheets in and by spring actuated arm means.
Figure 3:
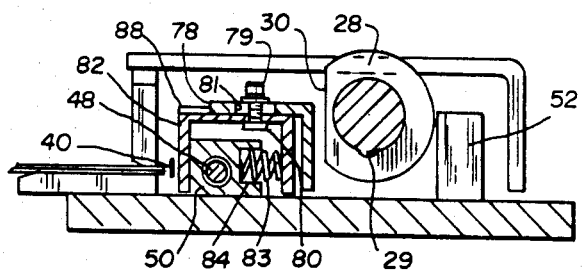
FIG. 3 represents the apparatus of FIG. 2 in a side, partly sectional view, and partly diagrammatic and with spring means for urging the heating ribbon into an established position.

As seen in FIG. 2, the underside of screw 56 is made with a circular groove which is sized to receive and retain a roll pin 57. This roll pin is carried in a transverse hole formed in an L-shaped support member 58. An elongated aperture 60 is formed in this L-shaped support member 58 and in this elongated aperture the shank of said screw is carried. The forward end of this L- shaped support is provided with a pair of through holes (not shown) and in these holes is positioned a pair of cap screws 62 and 63 as seen in FIG. 1 which enter threaded holes and secure a clamp bar portion 64. This clamp bar portion is normal to the L-shaped support 58 and is urged with and by said L-shaped support into a clamping condition against a fixed support plate 66 as seen in FIGS. 2 and 3. It is to be noted in FIG. 2 that this L-shaped support 58 is actuated toward a clamping position by a spring plunger 68 and compression spring 70. A sliding bar or strip 72 is moved into and out of compressing condition so as to load or unload spring 70 when the bar 64 is removed from the apparatus.

It is to be further noted that shaft 26 has a plurality of recesses and mounted in each recess is a ball 74 which is adapted to and does engage the L-shaped support 58 at its midlength and lifts said L-shaped support 58 and clamp bar portion 64 from gripping condition. The lift force applied by the ball 74 is provided by the rotation of shaft 26 when the lever handle is manipulated. It is also be noted in FIG. 2 that about ninety degrees counterclockwise from the balls 74 are pins 76 which also engage the midlength of the L-shaped support when the shaft is further rotated counterclockwise. This additional lift causes the clamp bar portions 64 to be lifted for adjustment or other operations.

The cooling tube or conduit 48 as seen in FIGS. 1A, 1B, 1C, 2 and 3 is carried by and in block 50 and provides means for cooling this bar after heat has been applied to the ribbon or strip 40. In FIG. 3 there is depicted the apparatus for making the eccentric movement. The cams 28 have flat portions 30 and as the handle 32 and shaft 26 are rotated these circular cams are rotated so that the circular portion engages and pushes leftwardly an angle shaped shoe member 78. This member is adjustably positioned by means of a cap screw 79 and nut 80. A slot 81 is provided in member 78 for movement to the desired adjusting position. A channel-shaped member 82 having heat dissipation properties is shown and is moved by the angle-shaped shoe member 78 as this member is moved by the cams 28. Springs 83 are carried in formed recesses 84 in block 50 and urge the channel-shaped member 82 rearwardly. FIG. 2 shows a block 86 which is secured to the base 20 and provides a rearward stop limit to the angle-shaped shoe member 78. Also to be noted is a groove 88 formed in the top surface of the channel member 82 to provide a guideway for the angle-shaped shoe 78. This is particularly noted in FIG. 3.

Figure 4B:
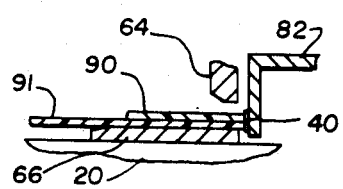
FIGS. 4A, 4B, 4C, 4D, 4E, 4F, 4G and 4H represent diagrammatic sectional side views of the bead melting and welding of the edges of the film and showing step-by-step operation of the apparatus of FIG. 1A.
Figure 4F:
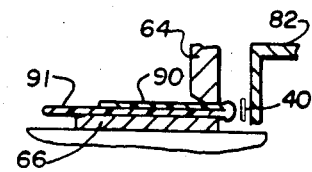
Figure 4A:
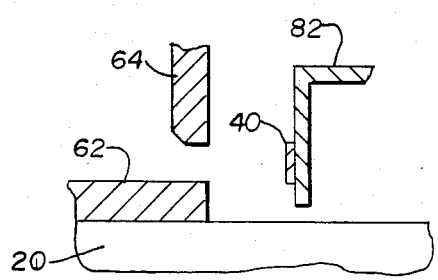

As seen in FIG. 3 the ribbon 40 is a small distance from the face of channel-shaped member 82 and this ribbon is urged forwardly to provide a locating stop for the film edges prior to welding as shown in FIGS. 4A to 4B. The clamp bar 64 then engages the films, after which the member 82 is retracted to the position of FIG. 3. Film plies 90 and 91 are then heated and melted at their edges that extend rightwardly from the clamp 64 by heat radiated from ribbon 40, shown in FIG. 4F. The electrical current is then stopped and cooling air from a source not shown is directed at the melted end of the film plies. The clamp 64 is lifted by rotating the arm 32 and the now welded film plies 90 and 91 are removed from the apparatus. The arm rotation returns the member 82 to the position in FIG. 4A, cooling the ribbon as it urges it to this position. Usually the movement of the ribbon is less than three-sixteenths of an inch and the movement is controlled by the eccentric movement of the channel-shaped member 82.

To obtain optimum weld properties the following parameters are critical and depend on the nature and thickness of the materials being welded: Length of material extending toward heat source from clamp members 64 and 66 (FIG. 4B); Spacing between ribbon and protruding material prior to heating the ribbon (FIG. 3); Intensity and time of heating, and rate of cooling. The cooling provided by air directed at the weld and the water cooling, if used, establishes the period of time needed to cool the weld before the unclamping and removal from the apparatus. The critical parameters are shown in the chart of FIG. 12 hereinafter more fully discussed.

FIGS. 1A, 1B and 1C are fragmentary and do not show the other end of the apparatus which may or may not have a handle 32. The clamping of the ribbon is by similar components but made as mirror images. The length of the apparatus is made to suit the width of film plies and the extent of clamp movement is a matter of selection as in the number of eccentrics. The shaft may be supported intermediate its ends by a support not shown. Bearings and stops are merely design selection.

STEP-BY-STEP ACTUATION AS IN FIGS. 4A THROUGH 4H

Satisfactorily performed step-by-step bead welding by the apparatus of FIGS. 1A, 1B, 1C, 2 and 3 and the very critical parameters are shown for the satisfactory welding of the hard to weld thermoplastic materials. In FIG. 4A the lower fixed support plate 66 has its inner (right) face about sixty-three thousandths of an inch from the face of the heating ribbon 40. It is anticipated that the upper jaw clamp member 64 in holding position is aligned with this plate 66. Member 82 is adjacent the rear surface of ribbon 40 which is not heated but has been moved forward to provide a stop for plies 90 and 91. The projection of the ends of these plies from the jaw faces to the face of the ribbon is about one-sixteenth of an inch.

In FIG. 4B the material plies 90 and 91 have been moved into place between the clamp jaws 64 and 66 and into a stop with ribbon 40. In FIG. 4C jaw 64 has been moved in clamping condition with the plies now retained and projecting from the holding edges of the jaws the desired distance. In FIG. 4D the channel-shaped member 82 has been moved rightwardly by the action of the lever and the ribbon 40 now moves rightwardly a short determined distance which is about one-thirty-second of an inch.

Figure 4E:
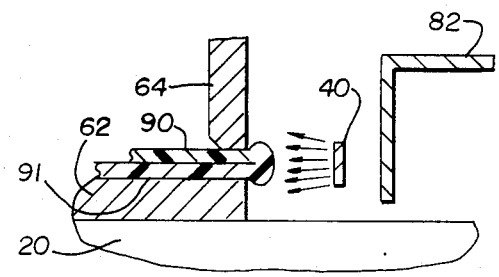
Figure 4C:
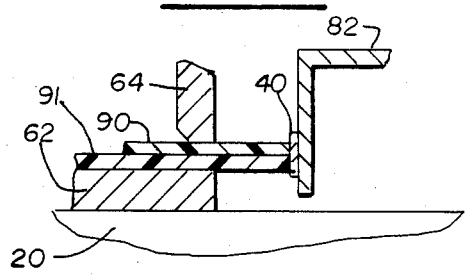
Figure 4G:
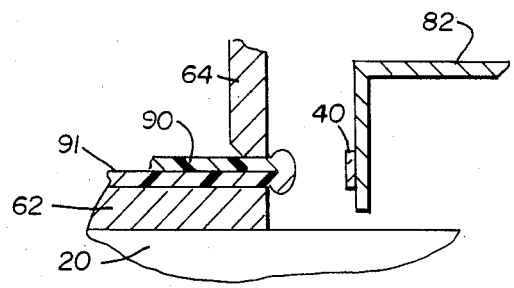
Figure 4D:
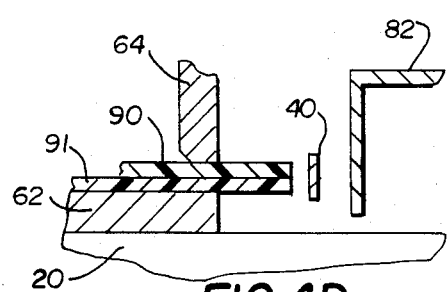
Figure 4H:
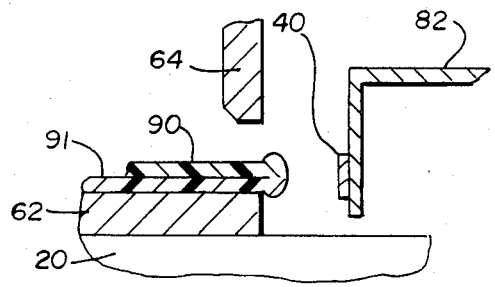

In FIG. 4E the ribbon 40 is heated to the desired degree and for the desired time interval. The protruding ends of the plies melt and flow together. In FIG. 4F the heat in the ribbon 40 has been turned off and cooling of the bead weld occurs. In FIG. 4G the channel member 82 has moved to the left to engage and cool the ribbon 40 and begins to move it leftwardly while the clamp jaw member 64 is still in a gripping condition. In FIG. 4H the jaw 64 is moved upwardly to release the now welded plies and the apparatus is ready for receiving and welding the next plies of material.

It is to be noted that whether the plies are one mil. thick or ten mil. thick the projection from the jaw clamps is one-sixteenth of an inch. A tolerance of one-sixty-fourth inches is the extreme limit for making positive welds. The jaws are cooler than the weld temperature and so the projecting distance is very critical. If the plies do not extend this distance the cooler jaws cause the held plies to be at a temperature less than desired for a bead weld without delamination. If the plies are caused to extend beyond this distance the ply ends tend to draw away from each other and also char or burning may occur. Weakened welds are a result. The jaws may be cooled by fluid or air and the back-up 50 in which conductor 48 is carried provides means for cooling the ribbon 40. As the ribbon 40 becomes heated it tends to lengthen and so member 42 as shown in FIG. 1C is moved by spring means (not shown) to maintain the tautness in the ribbon.

EMBODIMENT OF FIGS. 5 AND 6A THROUGH F

Figure 6A:
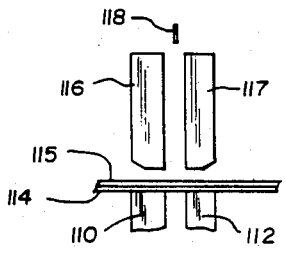
FIGS. 6A, 6B, 6C, 6D, 6E, and 6F represent progressive steps of the bead welding performed by the apparatus of FIG. 5, these views diagrammatically showing step-by-step operation of said apparatus.
Figure 6B:
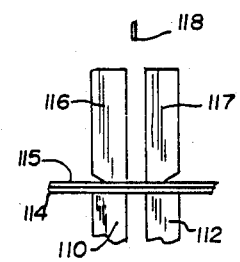
Figure 6C:
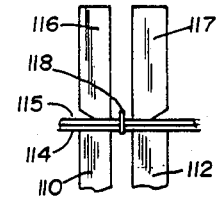

The welding of very hard to join materials such as Mylar and spun bonded thermoplastics may include the joining of two or more plies intermediate their edges or ends. Two fixed jaw members 110 and 112 support two or more sheets or plies of materials. As shown in FIG. 6A plies 114 and 115 are secured in place by movable jaw members 116 and 117 which are adapted to be moved downwardly to a clamped condition as seen in the second step of FIG. 6B. While retained in the desired clamped condition a heated strip or ribbon 118 is moved downwardly to and through the clamped plies 114 and 115 as seen in FIG. 6C. The means for supporting and moving this heated ribbon 118 is depicted as a cylinder 120 which carries a stretcher member 122 having its ends provided with biased outwardly support means 124 and 125. Insulating means or blocks 127 and 128 are provided so that an electrical current is not carried from the ribbon 118 to the actuating apparatus usually of metal.

Figure 5:
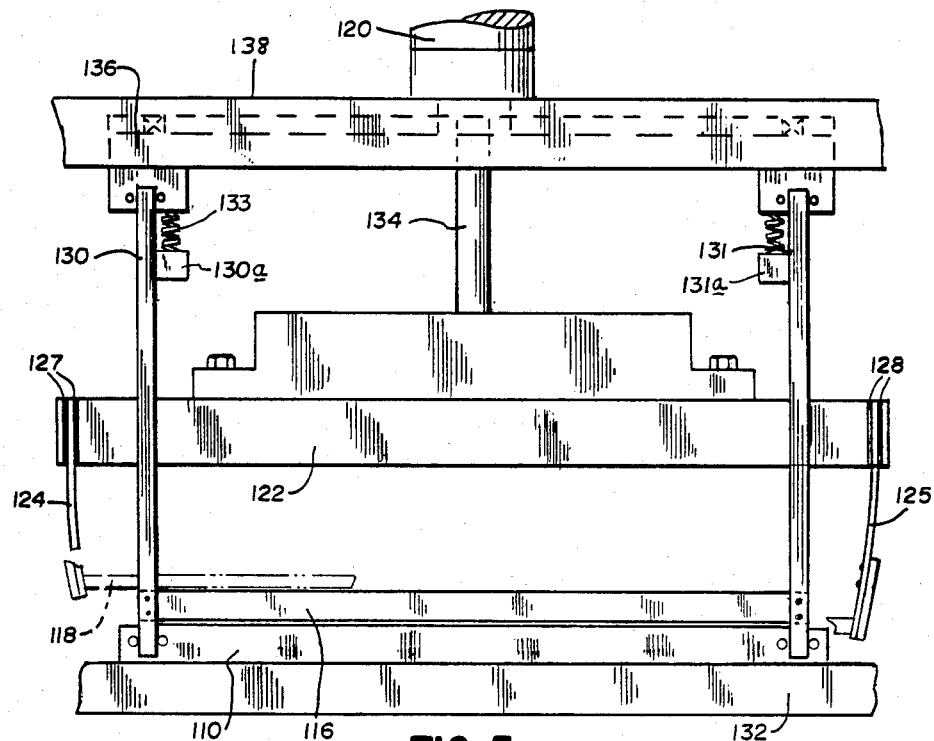
FIG. 5 represents a diagrammatic side view of the apparatus for clamping, severing and bead welding of two or more plies of sheet material.

In FIG. 5 the upper and movable jaw members 116 and 117 are carried by end members 130 and 131 which may be guided in their reciprocable movement by means on a base member 132. Shown is a piston rod 134 that moves stretcher member 122 downward and upward. Members 130 and 131 follow 122 downward until the movement of clamp jaws 116 and 117 engage and retain the plastic plies 114 and 115 therebetween. The piston 120 is carried by the support 138. The reciprocal movement and timed operation is controlled by means not shown. Springs and adjusting means may be provided so that the jaws 116 and 117 do not travel downward beyond the desired limit.

Figure 6D:
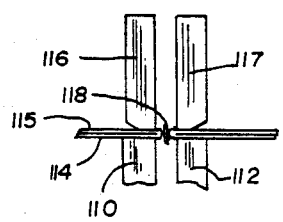
Figure 6E:
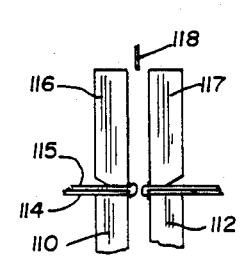

In FIG. 6D the film plies 114 and 115 are shown as being severed by a heated ribbon 118. This heated ribbon melts both plies and produces a bead weld. The plies remained clamped while the bead melt is cooled. During this period of cooling time for the weld the heated ribbon 118 is again moved upwadly as seen in FIG. 6E. After a determined period of cooling time the jaw members 116 and 117 are again moved upwardly as in FIG. 6F and the plies 114 and 115, now welded and severed, have a bead weld to join the plies at the severed position.

Figure 6F:
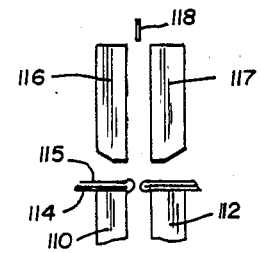

The thickness of the film plies and the composition of the material of the plastic film are critical to the desired welding of the plies together. The temperature in the heated ribbon 118 and speed of movement of said ribbon is established in view of the thickness and composition of plies of material. The spacing of the jaw members from the heated ribbon is contemplated to be about one-sixteenth of an inch with the weld or bead formed by surface tension toward the clamp jaws as indicated in FIGS. 6E and 6F.

The ribbon 118 is usually from four to twelve thousandths of an inch in thickness and from one-eights of an inch to about one-quarter inch in width but this is a matter of selection. The spacing of the internal walls of the jaws 110 and 112 and 116 and 117 is the thickness of the ribbon plus one-eighth of an inch. The resulting projection of plies at cutting and welding is the critical one-sixteenth of an inch above noted. The jaws are cooler than the heated ribbon and the bead weld is only made at the projecting portions of the plies. The ribbon 118 is alternately heated and cooled with the heat present when the ribbon 118 is brought to and between the plies 114 and 115 to effect the severing and weld of the plies.

OPERATION OF THE APPARATUS OF FIGS. 5 AND 6

As depicted in the view of FIG. 5 the header member 122 moves up and down and with the upward movement blocks 130a and 131a attached respectively to the members 130 and 131 engages springs 133 which provides a cushion stop. The view of FIG. 5 is diagrammatic for the purpose of illustration. Header member 122 is slidable along members 130 and 131 and as member 122 is moved upwardly said stretcher member 122 engages the blocks 130a and 131a and causes these members 130 and 131 to be raised and jaw clamps 116 and 117 to be raised. The cylinder 120 has a control stop for the upper lift extent. The ribbon 118 is moved as header member 122 is cycled.

A lost motion is combined in the downard actuation. The jaws 116 and 117 are above jaws 110 and 111 as in FIG. 6A and as the header member 122 is moved downwardly springs 133 cause the members 130 and 131 to also move downwardly to effect the clamping actuation of FIG. 6B. Ribbon 118 is continued to move downwardly with member 122 to effect the severing as in FIG. 6C. Springs 133 are selected to effect the desired clamping force.

EMBODIMENT OF FIGS. 7 AND 8

In FIGS. 7 and 8 is shown apparatus for continuous edge welding of strips of thermoplastic materials. As depicted, a base plate 150 carries the several components of this apparatus, and is a rather diagrammatic showing of the preferred arrangement and function of said apparatus. Film sheets 152 and 153 are brought between and moved forwardly by upper and lower belts 155 and 156. As shown, these belts are endless and are carried and advanced by grooved pulleys 158, 159, 160 and 161. The two right pulleys are designated as 158 and 159 and the pulleys to the left as viewed in FIG. 7 are designated as 160 and 161. The left pulleys are carried by a header member 163 and said member pivotally carries arms 165 and 166 and the rotatable pulleys 160 and 161. An adjusting screw 168 is carried in a threaded nut or member 169 in header member 163. Rotation of the screw 168 moves the pulleys 160 and 161 to the right or left to loosen or tighten the belts 155 and 156. The belts 155 and 156 are matched in their speed by a gear arrangement associated with pulleys 158 and 159. These gears have a like pitch and number of teeth. Driving means (not shown) cause the gears and their associated pulleys to drive the endless belts in synchronism.

Intermediate the ends of the apparatus and between the pulleys and adapted to engage the film sheets 152 and 153 is the edge welding station. Upper and lower blocks 182 and 183 are carried on angle supports 185 and 186. Each block has a water cooled passageway with the upper passageway identified as 188 and the lower as 189. Carried by blocks 182 and 183 are clamp jaw members 191 and 192, each adjustably secured by cap screws 194 to blocks 182 and 183 respectively. Jaw member 191 is spring biased toward the plies carried between the belts and the screws 194 permit such biased movement. Like motion is permitted in jaw member 192 which is also spring biased. The springs may be compression springs 195 or may be resilient material such as rubber or may be a pneumatic cylinder. This means is selected by the designer. A heated ribbon or strip 196 is shown in FIG. 8 and melts the protruding edges of the material strips or sheets 152 and 153. Since the spacing of the material edges relative to the heat source and clamping means is critical, cutting means as shown in FIG. 9B and 10B are provided between the endless belts and the material to be trimmed. Rollers 197 and 198 carry the now welded material and the endless belts 155 and 156. Air cooling may be directed at the weld when the material emerges to region 199 of the belts path. Cooling clamp rollers may also be used on the soft weld in region 199, additionally re-orientating the weld material.

EMBODIMENTS OF FIGS. 9A, 9B, 9C, 10A AND 10B

Figure 9C:
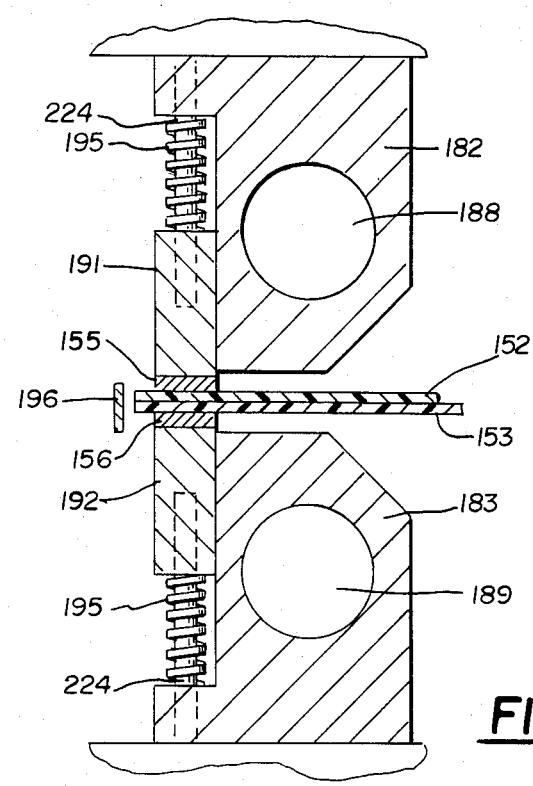
FIG. 9C represents a fragmentary sectional view showing in enlarged detail the relationship of the bands, the plies of materials and the spring-actuated jaws of the continuous welding apparatus.

The embodiments of FIGS. 9A, 9B, 9C, 10A and 10B represent the apparatus of FIGS. 7 and 8 with alternate trimming means and showing removal of trim material. The jaws 191 and 192 are shown as spring biased toward each other. The diagrammatic representations of FIGS. 9A and 10A depict apparatus with advancing of material from right to left whereas in FIG. 7 the advanced material is shown fed left to right. The apparatus may be arranged to suit the conditions of operation and is substantially symetrical.

In the diagrammatic showing of FIG. 9A endless metal bands 155 and 156 may be advanced and tensioned by apparatus as in FIG. 7 or may use other means. Rollers 200, 201, 202 and 203 are depicted as carrying these bands are conventionally grooved. Idler rollers 205, 206, 207 and 208 guide these bands. Delivery and storage rolls 210 and 211 deliver the material 152 and 153 as above described in FIG. 7. Rollers guide and direct the plies of material 152 and 153 to and between the bands 155 and 156. To the left of rollers 205 and 206 there is provided a knife 216 which is disposed to trim the plies of material. A deflecting roller 218 causes the trimmed mterial 219 to be carried to and wound on a roller 220. After bead welding (the heated ribbon is not shown in this view) the now welded plies 222 are wound on a take-up roller 223. Retaining means 185*a* and 186*a* are fixedly secured to a support plate not shown. Springs 195 cause jaw members 191 and 192 to move toward the plies and each other.

In FIG. 9B a fragmentary and diagrammatic isometric view shows how the plies 152 and 153 of material, as fed from rolls 210 and 211, are advanced to and beyond knife 216. The scrap or unwanted edge material 219 is redirected upwardly by roller 218. Upper and lower jaws 191 and 192 carry these plies to and past ribbon 96. The now edge welded material is delivered to an accumulating roll 223. This view is very diagrammatic in that the band apparatus and the bands are not depicted.

In FIG. 9C there is an enlarged sectional view of the jaw clamp apparatus depicted in FIG. 8 and in this sectional view upper and lower blocks 182 and 183 respectively have cooling means or passages 188 and 189. Upper and lower bands 155 and 156 carry the trimmed plies 152 and 153 to and through this welding station. Jaw members 191 and 192 are spring biased toward each other by springs 195. The bead weld is provided by a heated ribbon 196 which is spaced from the extending edges of the plies so as to avoid contact with the travelling edges of the material. When the edges become molten it is very desirable and important that the material of the plies does not engage and contact the heated ribbon. In this view springs 195 are slidable on retaining pins 224.

EMBODIMENT OF FIGS. 10A AND 10B

In the schematic view of FIG. 10A the apparatus of FIG. 9A is repeated but rather than the knife blade 216 of FIG. 9A there is provided a heated ribbon 227 which precisely trims the advancing plies 152 and 153 delivered from rolls 210 and 211 respectively. The trimmed edge material identified as 228 is fed to and collected in roll 229. In all other respects the apparatus is very similar to or identical to that of FIG. 9A above described.

In FIG. 10B the very fragmentary isometric view shows the heated ribbon 227 disposed to cut and trim the plies 152 and 153 to a determined edge projection. The unwanted trimmed portion of the advancing plies identified as 219 is disposed in a conventional manner. Welding is achieved by and between jaws 191 and 192 as in FIG. 9C above described. It is very essential that the jaws 191 and 192 and bands 155 and 156 grasp the plies of material so that the protrusion of the plies is the established one-sixteenth of an inch and that the heated ribbon 196 does not contact the bead weld as it is made. Cooling of the plies adjacent the projected edges is very important.

EMBODIMENT OF FIGS. 11A THROUGH 11E

Referring next to the apparatus for clamping multiple groups of plies of materials. As depicted in FIG. 11A there are five clamp bars 301, 302, 303, 304 and 305 and between these jaws plies of material 306 and 307 are placed and positioned. A stop plate 310 shown in phantom outline is disposed to provide a determined projection of the ends of the plies from the face of the jaws. This projection is one-sixteenth of an inch. Springs 312 are maintained on posts 314 and are adapted to open the jaws for insertion and withdrawal of the plies of material.

Figure 11B:
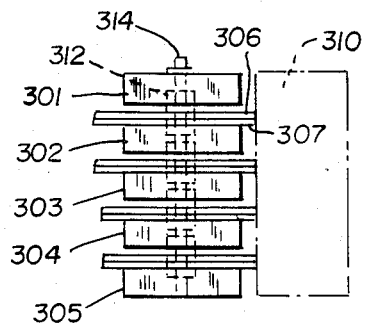
FIG. 11B represents a side view which is partly diagrammatic and showing the securing jaws in an open condition and with the plies of material protruding an established distance.
Figure 11C:
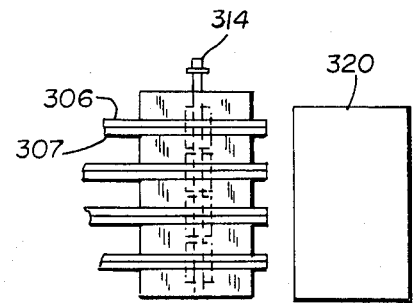
FIG. 11C represents the securing jaws of FIG. 11B in a closed condition and with a heat source melting the plies to form a bead weld.
Figure 11D:
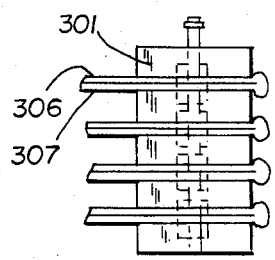
FIG. 11D represents the gripped plies of FIG. 11C now bead welded.
Figure 11E:
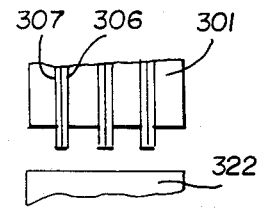
FIG. 11E represents the securing of plies of material and bringing them in and with a vertical motion to a heated plate.
Figure 11A:
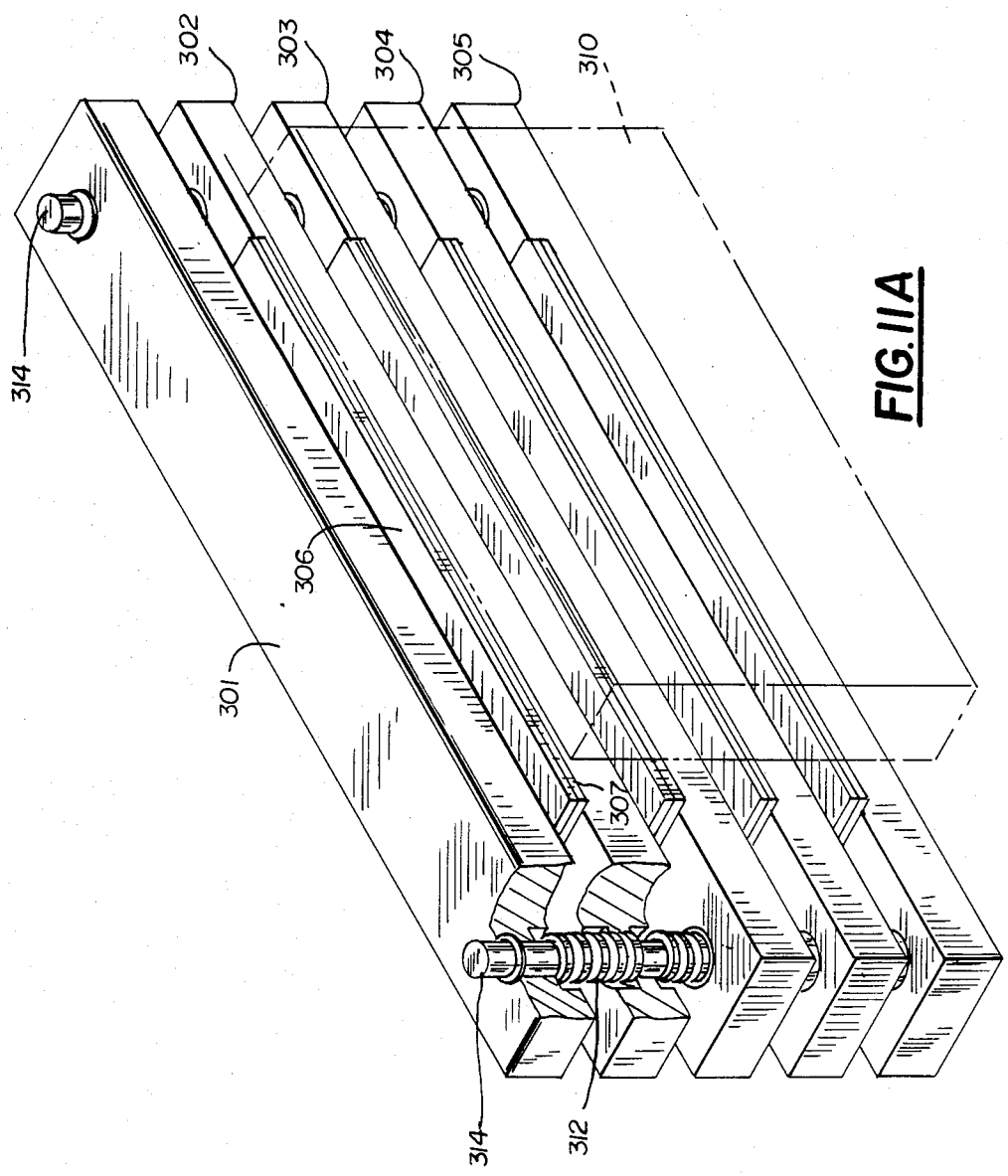
FIG. 11A represents an isometric view and partly diagrammatic of a multiple jaw clamp apparatus in which multiple groups of plies of materials may be secured for bead welding.

In FIG. 11B is a diagrammatic representation of the apparatus of FIG. 11A before clamping of the plies. In 11C the jaws have been brought to a clamped condition and a heat source 320 is brought to the ends of the plies of material. In FIG. 11D the plies are shown as bead welded. In FIG. 11E the protruding clamped plies (three groups) are shown as depending vertically over a heated platen 322. Welds formed in this manner allow gravity to substantially improve the symetry of the bead. In addition to using heat from an electrical heating source, preheated gasses such as air, or hot gasseous combustion products may be employed to effect the weld. When hot gasses are directed against the protruding congruent edges of the materials, they form into welds as shown in FIG. 11D. Rapid cooling is effected by an air stream to avoid recrystallization as in the case of Mylar. This hot gas method is particularly useful when making shaped welds, rather than straight line welds as described herebefore.

It has been found that gas flow around the protruding material edges tends to keep the clamp edges cooled enough to permit the use of combustible materials for the clamps, saving cost in their construction, particularly when shaped.

CHART OF FIG. 12

Referring next and finally to the chart of FIG. 12 the temperature and time is displayed as a comparison of the various thickness and composition of the films. Thickness comparisons shown are the most common of the plies used and depict from one to ten mil in thickness. The Line identified as 400 represents a temperature of about twenty-three-hundred degrees Fahrenheit and is substantially constant from one to ten mils. in thickness and is for highly oriented high density polyethylene films.

The Line 404 represents a downwardly sloped line from nineteen-hundred-fifty degrees to fifteen-hundred degrees Fahrenheit at ten mils. thickness and is for heat set biaxially orientated polypropylene films.

The Line identified as 402 is about twenty-two hundred and fifty degrees Fahrenheit and is substantially constant from one to ten mils. in thickness and is for polyolefins, knit, woven and non-woven materials.

The Line 406 represents the time and temperature from two-thousand degrees to thirteen-hundred degrees Fahrenheit for polyester films, knit, woven and non-woven materials.

The Line 408 represents the time and temperature from fifteen-hundred degrees to twelve-hundred degrees Fahrenheit and is applicable to orientated and cast polyamid films; knit, woven and non-woven materials.

It is to be noted that Lines 404 and 406 require less than one second at one mil. thickness. The cooling time which is an integral part of the bead weld process is dictated by the thickness of the material, the temperature of the clamp jaws and efficiency of additional cooling devices in the system. The methods hereinabove disclosed successfully address these problems.

The several embodiments above described contemplate welding at least two plies of thermoplastic film together. These depicted apparati contemplate that the very difficult to weld films will be successfully welded by localized melting of the plastic film. Whether two or more plies are joined at the ends, edges or intermediate thereof, the heating source, usually a heated ribbon, is brought to a temperature much greater than the melting temperature of the plastic. This achieves a very fast melting of the plastic. The clamping means provides a cooling means to prevent any of the films held in the gripping means from changing their characteristics.

Assuming Mylar D (TM Du Pont) is to be welded, the melting temperature is 435° Fahrenheit and depending on the thickness of the film strips, such as one-half to ten thousandths of an inch, the ribbon is heated from twelve hundred to twenty-three hundred degrees Fahrenheit. The time of exposure is a very critical factor and the spacing from the ribbon to the edge of the plies, depending on their nature, when the ribbon is heated is about one thirty-secondth of an inch. The spacing between the clamps and the edges of the plies to be heated is from preferably fifty-seven to sixty-seven thousandths of an inch as applied to Mylar D. Production processes have indicated that one-sixteenth of an inch with an extreme tolerance of plus or minus one sixty-fourth of an inch establishes the limits or parameters of satisfactory bead welding of the edge. The edges of the clamp members as shown are sharp so that the cooling effect of the clamp members is not dissipated.

It is to be noted that the plies of film may be brought to a cooled ribbon and then clamped. After clamping, the ribbon is moved away from the film edges and the ribbon heated for a determined short interval of time. The weld is cooled by the clamp means and directed air flow and the welded portion released after which the process is repeated. When a heated ribbon is used as a knife, the heated ribbon severs the plies and a partial melting at this trimmed edge may occur. The belt arrangement may have a heated ribbon or member made with curved ends and be brought into the desired proximity as in FIGS. 9C and 10A. Removal of the trim from the knife cut or heated ribbon (FIGS. 9A, 9B, 10A and 10B) is effected by means shown.

The several embodiments show the joining or securing of two or more plies of materials by melting the materials at very local areas while gripping these same plies by clamp or belt means to hold together and cool the adjacent ply area and prevent melting of the plastic except in the protruding area. The total thickness of plies is usually one thousandth of an inch or greater. The cost of Mylar D and like plastic is usually high, so the thickness of the film is usually kept to a minimum for the cost of material.

The parameters providing the successful welding as noted in the above embodiments require that the heat source must provide uniform heat to both plies simultaneously. If a ribbon heat source is provided the ribbon must be substantially centered and perpendicular or normal to the edges of the plies so as to radiate heat equally and at the same rate to each ply. It is also very essential that the clamp means be uniform and specifically in those areas where the plies protrude there be no air gaps or ripples between the plies. The gripping force is also critical as too light a gripping force does not remove air from between the plies of material and too great a clamping pressure tends to cause or causes the plies to diverge from each other. Divergence is very detremential to satisfactory welds as the bead formed must remain centered and together so that when the bead weld cools the bead is very similar to a molded connection and the edge formation is as strong or stronger than the ply of material. Improper heating or clamping causing unequal heating or clamping produces a weld bead having inferior strength characteristics.

Terms such as "left", "right", "up", "down", "bottom", "top", "front", "back", "in", "out" and the like are applicable to the embodiments shown and described in conjunction with the drawings. These terms are merely for the purposes of description and do not necessarily apply to the position in which the welding apparatus for joining plies of film may be constructed or used.

While particular embodiments of the welding apparatus have been shown and described it is to be understood the invention is not limited thereto and protection is sought to the broadest extent the prior art allows.

What is claimed is:

1. A method of joining the congruent edges of a plurality of laminar thermoplastic plies of material and including providing heating for melting locally said plies at a programmed temperature and for a selected time period, said method including the steps of:
    (a) bringing said congruent plies to and between opposed cooled metal jaws, each of which have sharp corners at their facing and gripping edges, and with at least one of the jaws movable so as to provide a clamping condition of the plies of material and with the jaws applying a predetermined pressure which avoids unwanted divergence of the plies;

(b) precisely positioning the congruent edges of the plies so that the edges of said thermoplastic material extend from the sharp corners of the facing and gripping edges of the opposed cooled jaws, this extending positioning of said edges of the plies at a distance of one-sixteenth of an inch and within production limits of plus or minus one sixty-fourth of an inch;

(c) heating said extending edges of the plies to a determined degree of temperature which is greater than the melting temperature of the plastic to be welded, said heating by a ribbon of conductive metal which is brought to desired heat by passing electrical current therethrough sufficient to melt the plies of plastic and cooling said ribbon when the current is caused to be shut off, this heating creating a melting and weld of said edges of the plies, and (d) cooling the melted portion of the plies of thermoplastic material so as to again solidify said material while maintaining a gripping of said plies by the cooled metal jaws until solidification of the molten weld is achieved.

2. A method of joining laminar thermoplastic plies, as in claim 1, which includes the additional step of moving the ribbon when in a cooled condition toward the extending plies to establish a stop against which the ends of the plies are brought to a determined precisely positioned protruding distance of the ends of the plies from the gripping jaws.

3. A method of joining laminar thermoplastic plies, as in claim 1, in which the ribbon is removably held in tension at its ends by clamp means, and there is provided an additional step of moving most of the ribbon length toward and away from the cooled metal jaws.

4. A method of joining laminar thermoplastic plies, as in claim 1, which further includes the step of having one of the opposed jaws as a fixed member and the other jaw as a movable member, with the movable jaw member moved into and away from clamping condition by cam means carried by a shaft and positioning said shaft substantially parallel to the effective weld of said plies.

5. A method of joining laminar thermoplastic plies, as in claim 4, in which the cam means which moves the movable jaw also moves the conductive metal ribbon.

6. A method of joining the congruent edges of a pair of advancing plies of laminar thermoplastic film of indeterminate lengths, and including providing radiant heating for locally heating said edges of the plies at a programmed temperature and for a selected period of time, said method including the steps of:

(a) carrying said plies of film to and between endless upper and lower metal belts or bands and arranging said belts or bands so as to be carried and advanced by and on grooved pulleys, aligning and maintaining said bands so as to bring the edges of the plies into a determined contiguous relationship during edge welding, said endless bands carried at one end by a pair of opposed pulleys adjustably carried by a header member and a pair of pivotally attached arms with this header member by adjusting means, with each of said metal belts having sharp corners at the edge adjacent to and in engagement with and holding the thermoplastic plies, said belts or bands carried by and slideable in and on blocks and maintaining these blocks in a cooled condition during welding while providing means so as to bring the bands or belts together sufficiently so that the aligned and protruding edges of the thermoplastic film plies carried by said belts or bands extend one-sixteenth of an inch from said sharp corners of the metal belts or bands and within a tolerance of one sixty-fourth of an inch without excessive pressures to cause divergence of the extending edges of the plies;

(b) locally heating the protruding edges of the plies when brought by the advancing belts to and between said blocks, said heating by a precisely-positioned adjacent conductive metal ribbon whose temperature is controlled by passing a measured amount of electrical current through said ribbon with temperature melting the protruding extending edges when brought to and between the cooled blocks, said temperature greater than the melting temperature of the thermoplastic plies to be welded to effect a welding of said protruding edges, and (c) cooling the melted edges of the plies of thermoplastic film so as to again solidify said film while maintaining a gripping of said plies by the advancing belts or bands until solidification of the molten weld is achieved.

7. A method of joining the congruent edges of advancing plies of thermoplastic materials, as in claim 6, which includes the further step of trimming the edges of the advancing plies before heat welding by a cutting blade so as to provide a precise extending dimension of these plies.

8. A method of joining the congruent edges of advancing plies of thermoplastic materials, as in claim 6, which includes the further step of trimming the edges of the advancing plies before heat welding by the use of another heated ribbon which severs or splits the plies of material along a selected line and the now-trimmed material in unwelded condition is carried by said belts by and past the heated ribbon at said precise extension of the plies.

9. A method of joining the congruent edges of a plurality of laminar thermoplastic plies and including providing radiant heating for melting locally said plies at a programmed temperature, and for a selected time period, said method including the steps of:

(a) bringing said congruent plies to and between two fixed and precisely spaced apart cooled jaw members and two substantially like and precisely spaced apart reciprocably movable cooled jaw members, said precisely spaced apart movable cooled jaw members having their faces substantially parallel and providing a space therebetween for a reciprocably-controlled movement of a taut conductive metal ribbon, said controlled movement of the ribbon being substantially equidistant from and parallel to the face of said jaws, this precise spacing being one-eighth of an inch plus the thickness of the reciprocably-moved ribbon, and with the facing portions of all said jaw members having sharp corners at their inwardly-facing gripping edges and moving said reciprocable jaw members into a gripping condition of said plies, and when said plies are gripped, (b) providing mechanism for moving the taut ribbon toward and away from said gripped plies when and while gripped and heating said conductive metal ribbon by electrical energy sufficiently to melt said gripped plies;

(c) cutting said gripped plies by moving said heated conductive metal ribbon through the held plies so that the extending portions of the held plies when cut by the heated ribbon extend from the facing portions of the gripping jaw members a distance of one-sixteenth of an inch and with a production tolerance of plus and minus one sixty-fourth of an inch, this melted portion of said plies forming the welds on each extending portion, and (d) moving the reciprocated heated ribbon from between the gripped plies, then cooling the melted portions of the plies to form bead welds in close proximity to each jaw pair; after which the reciprocably movable jaws are moved to an unloading condition and position.

10. A method of joining congruent plies of thermoplastic material, as in claim 9, in which the movement of reciprocable jaw members and the moving of the heated ribbon is achieved by cylinder means, and there is a further step of providing bias and adjusting means for limiting the downward travel of the movable jaws before the movement of the heated ribbon passes through the plies and said ribbon is removed from said severing condition before providing the unloading condition of the reciprocable jaws.

11. A method of joining congruent plies of thermoplastic material, as in claim 9, in which the ribbon is maintained in a taut condition by bias means, and there is provided the step of insulating the ribbon from conductivity with the jaw members and actuating apparatus.

12. A method of joining stacked multiple-ply groups of laminar thermoplastic materials at their congruent edges and including providing heating for melting locally said multiple groups of plies and at a selected time period and programmed temperature, said method including the steps of:

(a) forming and arranging a plurality of jaw plates with the number of plates at least one more than the groups of plies to be joined, these jaw plates having sharp corners at the edges that grip the plies of material, said jaw plates having guide means exterior of the plies of material to be held;

(b) positioning the congruent edges of the stacked plies so as to protrude from the sharp gripping corner of the jaw plates a distance of one-sixteenth of an inch and with a production tolerance of plus or minus one sixty-fourth of an inch;

(c) providing stop means for establishing said desired one-sixteenth of an inch projection while the jaw plates are brought to a gripping condition and providing removal means for the stop means after the plies of material are gripped;

(d) supplying heating means for said selected time period to the protruding edges of thermoplastic plies so as to melt said ply edges and effect a bead weld, and in which heating is only after the stacked plies have been gripped by the jaw plates sufficiently to provide pressure on the plies of material without unwanted divergence;

(e) cooling said bead weld before loosening the gripping of the jaw plates, and (f) opening the jaw plates sufficiently for removal of the welded plies of material and insertion of sequential ply groups of material.

13. A method of joining stacked plies of material, as in claim 12, in which the arranging of the plurality of jaw plates by guide means includes aligning said plates by pins and the jaw plates are urged to an open condition by springs.

14. Welding apparatus for joining the congruent edges of a plurality of laminar thermoplastic plies, said apparatus adapted to provide radiant heating by a conductive metal ribbon, said ribbon when in a heated condition melting locally said plies with a programmed temperature and for a selected period of time, this apparatus having a clamp assembly with opposed cooled metal jaws and with a lower jaw fixed to a support frame and a reciprocably movable jaw disposed above the fixed lower jaw and disposed in a plane substantially normal to the supporting surface of the fixed jaw, with said conductive ribbon retained in a taut condition by bias means and in its cooled condition moved to a determined position to establish a stop for limiting protrusion of the ply edges to a distance of one-sixteenth inch from and within a production tolerance limit of plus or minus one sixty-fourth of an inch, and then moving the conductive metal ribbon away from the protruding edges of the plies and heating said ribbon by passing electrical current through said ribbon only after the ribbon is moved away from the edges of the plies of material, said heated ribbon melting the protruding edges of the plies, and after melting the edges the electrical current is caused to cease and the melted portion of the plies is cooled to provide a solidified condition while a gripping condition of the plies by the opposed jaws is maintained, the improvement in the welding apparatus including:

(a) means for forming the gripping edges of the jaws with sharp corners so as to provide sharp edges at the opposed and facing surfaces;

(b) providing means for moving the reciprocably movable jaw by and with a clamp bar, said bar moved by a cam means carried on and by a shaft whose axis is substantially parallel to the faces of the jaws and to the effective weld of said plies, and (c) means for rotating said shaft to predetermined limits and at one limit of rotation the cam moves the conductive ribbon to said stop position for the plies to establish the desired projection from the jaws while moving the movable jaw to a release condition and, at the other limit of rotative movement of the shaft, the reciprocably movable jaw is moved into said gripping condition of the plies and the ribbon is moved away from said edges and then brought to a heated condition with the jaws gripping the plies with a predetermined pressure so as not to cause divergence of the extending ply edges while the conductive ribbon is heated and the weld is made, after which the ribbon and weld are cooled.

15. Welding apparatus for joining congruent plies, as in claim 14, in which the reciprocable movable jaw as it is actuated includes mechanism in which an upper clamp bar is carried by an L-shaped support member and this support member is carried by a support bar and is removable therefrom by manipulation of a cap screw having a groove formed in a shank portion thereof and into this groove is mounted a pin carried in the L-shaped support member and pivotally retaining said L-shaped member.

* * * * *